Aug. 19, 1958  J. R. WEST  2,848,029
CUTTER AND BLOWER UNIT FOR FORAGE HARVESTERS
Filed Dec. 15, 1954  2 Sheets-Sheet 1
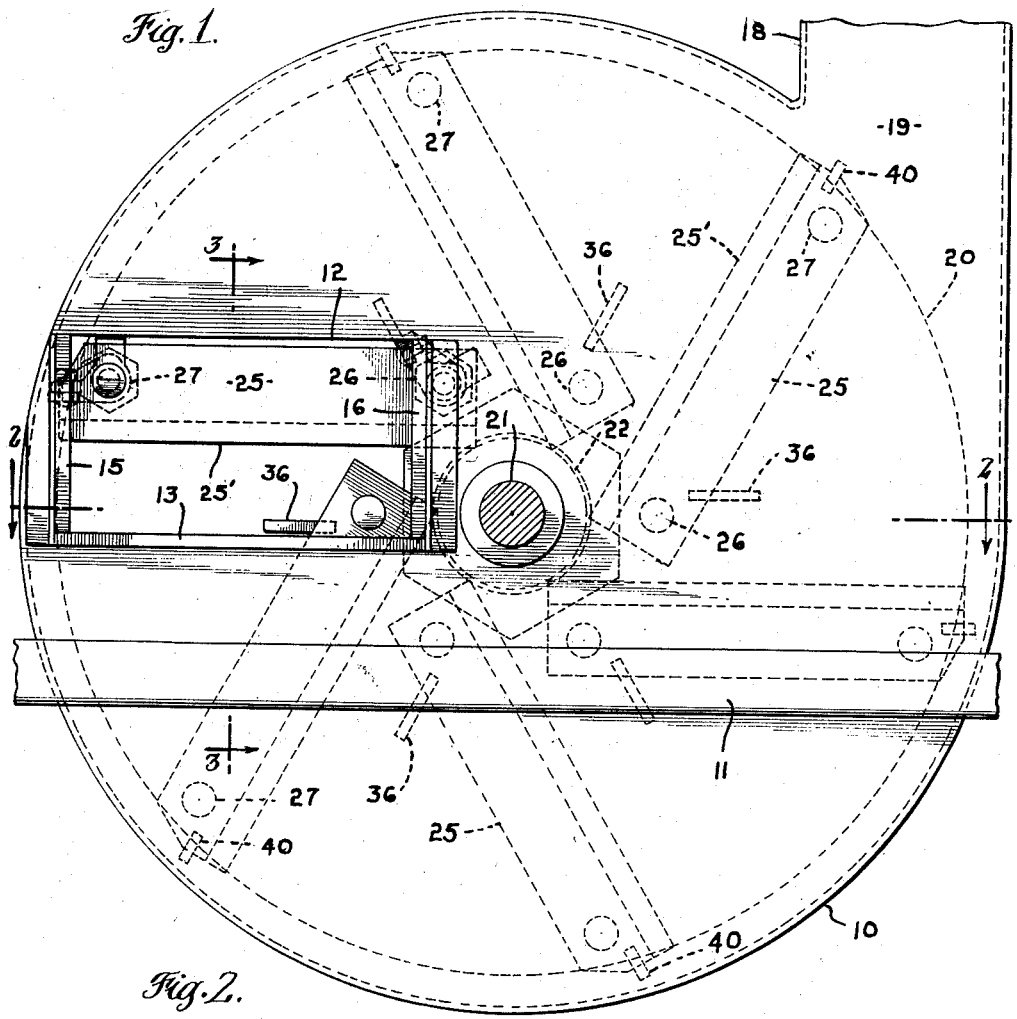
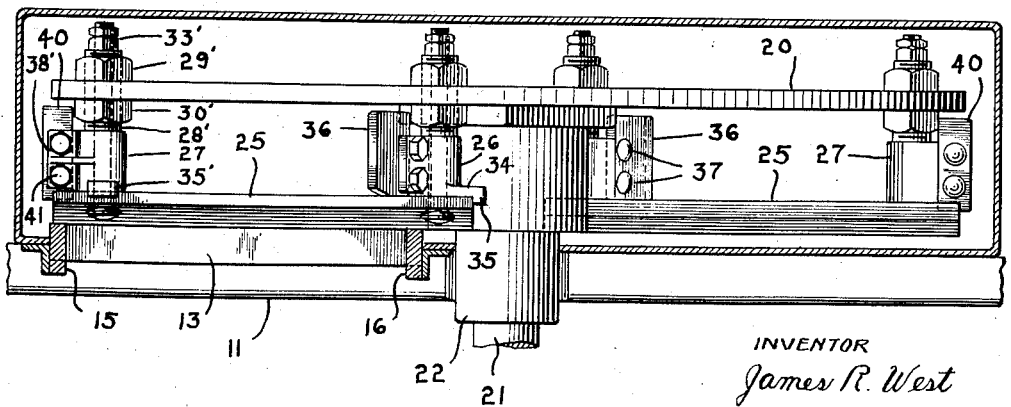
INVENTOR
James R. West
By Richard E. Babcock Jr.
ATTORNEY Aug. 19, 1958 J. R. WEST 2,848,029
CUTTER AND BLOWER UNIT FOR FORAGE HARVESTERS
Filed Dec. 15, 1954 2 Sheets-Sheet 2
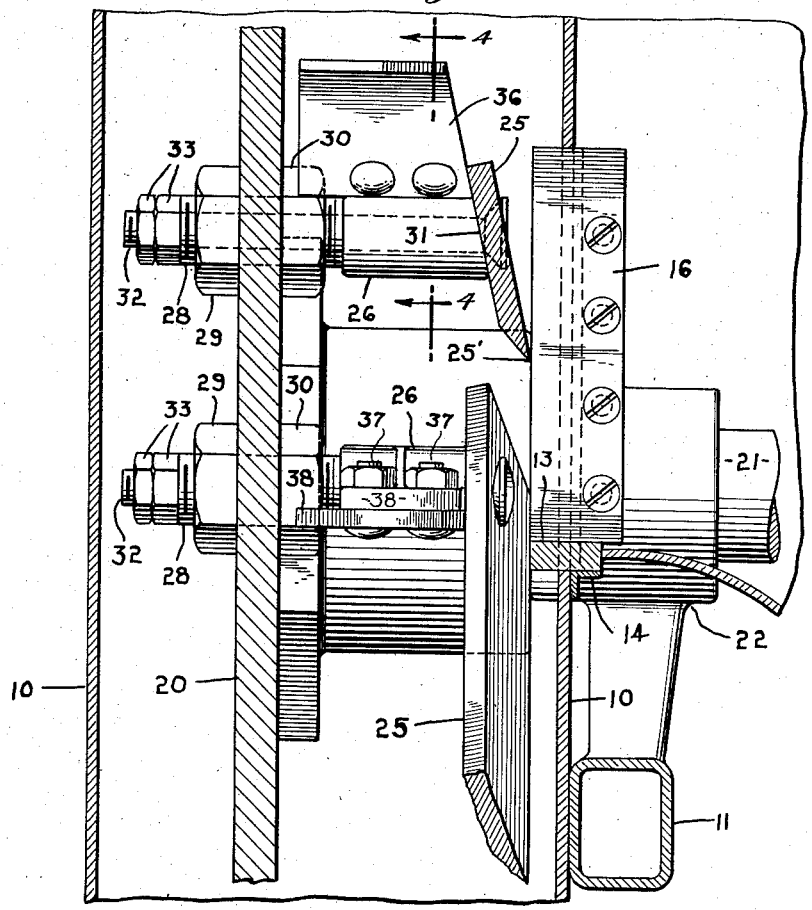
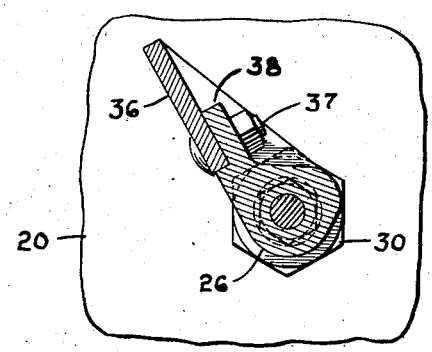
INVENTOR
James R. West
By Richard E. Babcock Jr.
ATTORNEY

United States Patent Office 2,848,029
Patented Aug. 19, 1958

2,848,029

CUTTER AND BLOWER UNIT FOR FORAGE HARVESTERS

James R. West, New Holland, Pa., assignor, by mesne assignments, to Sperry Rand Corporation, New Holland, Pa., a corporation of Delaware Application December 15, 1954, Serial No. 475,327

2 Claims. (Cl. 146—107)

This invention relates to a flywheel type cutter and blower unit for forage harvesters.

In such units, it has been known to mount radially disposed cutting knives on a rotating flywheel disc for cooperation in usual manner with a ledger plate over which suitable crop material is fed. Customarily the flywheel disc is disposed in a housing having a tangential discharge outlet or chute and is provided with fan blades or paddles which coact with the cut material to whirl it around within the housing and discharge it tangentially through said discharge outlet.

In some cases the fan blades have been more or less radially coextensive with the cutting knives and thus have been so positioned as to impact sharply against the incoming material immediately after it has been cut. The resulting series of shocks have imposed undesirable stresses on the cutter and blower unit and its supporting structure and have also required excessive power for operation of the unit. Also, it is believed that in some cases the material has tended to cling by friction to the fan blades with resulting slowing-up of the progress of material through the cutter and blower unit.

In other cases it has been known to disposed the fan blades for rotation in paths concentric with the radially outer end portions or tips of the knives. While such arrangement has reduced the impact shocks above referred to, it has been found that the absence of any means for causing positive radial outward movement of the cut material into the path of these fans or blades has caused the cut material to remain unduly long in the blower housing, and thereby has reduced the capacity of the cutter and blower unit.

With the foregoing in mind, the present invention has to do particularly with an improved arrangement and disposition of fan blades or paddles in such a cutter and blower unit. In accordance with the invention, the generally radially extending cutter knives are supported at their inner and outer radial ends only, in axially spaced relation from the flywheel, to leave a free and unobstructed space between the medial portion of each blade and the flywheel through which freshly cut material is free to rotate relative to the flywheel and knives. An inner series of generally radially directed fan blades or paddles is positioned on the flywheel for rotation in a path spaced radially inwardly from the medial radial portions of the respective knives and generally to one side of the incoming cut material to create centrifugal air currents which will cause the cut material to gradually accelerate its rotational speed to substantially that of the unit while also causing the cut material to move radially outward for eventual discharge through the discharge opening or port above mentioned. By virtue of the positioning of the fan blades inwardly of the midsections of the knives, it will be seen that they can impact against or physically engage but a relatively small amount of the incoming material and at a relatively slow speed due to their radial positions.

A second or outer set of fan blades or paddles is mounted on the flywheel adjacent the outer radial ends of the cutter knives for rotation concentrically to the said inner blades in a path radially spaced from same and lying on the opposite radial side of the rotational path pursued by the medial radial sections of the knives. These outer paddles engage and fling the discharged material tangentially through the discharge port and supplement the blowing action of the inner series of paddles in producing a conveying air current through the port and the discharge spout communicating therewith. It will be seen that the rotary air currents produced by the innermost blades will have gradually increased the rotational speed of the material until it has become substantially equal to that of the outermost fan blades or paddles at the time of engagement therewith, whereby any shock to the cutter and blower unit resulting from such engagement will be negligible.

The invention also includes additional incidental features such as the provision of simple and economical means for supporting the fan blades or paddles from the same means which support the opposite ends of the respective knives on the flywheel.

The preferred form of cutter and blower unit incorporating the foregoing features of the invention is illustrated in the accompanying drawings in which:

Figure 1 is a front elevational view of a cutter and blower unit such as is customarily employed in a usual ensilage cutter or field forage harvester, the driving shaft for the rotary cutter and blower unit being shown in vertical section immediately adjacent the front face of the blower housing, and portions of the supporting frame and of the discharge spout of the blower housing being broken away;

Figure 2 is a plan section through the casing on the line 2—2 of Figure 1, with the cutter-blower unit or rotor shown in plan view and with only the two horizontal knives shown for the sake of clarity;

Figure 3, an enlarged cross section on the line 3—3 of Figure 1, but including also the supporting bearing structure for the drive shaft of the unit; and Figure 4, a cross section on the line 4—4 of Figure 3.

Referring now in detail to the accompanying drawings, the reference character 10 designates a usual cylindrical blower housing fixedly carried by a supporting frame structure 11 which is shown in part only. The crop material to be treated is delivered into said housing 10 through a preferably rectangular infeed opening 12 in the forward axially presented face thereof across a preferably horizontal ledger bar 13 which is mounted on an angle bracket 14 on housing 10 and projects across the lower edge of the infeed opening 12 into the housing 10 for cooperation in usual manner with the rotating knives of the cutter and blower unit described in detail hereinafter. If desired, vertical guide plates 15 and 16, respectively, may define the opposite lateral sides of the opening. However, since these have no essential relation to the structure claimed herein, it is deemed desirable to dispense with further detailed description of them.

A tangentially directed discharge spout 18 communicates with the interior of the blower housing 10 through a peripherally disposed discharge opening or port 19 therein whereby material delivered into the said housing through infeed opening 12 may be processed by the cutter and blower unit therein and discharged tangentially through the spout 18 in conventional manner.

The cutter and blower unit of the invention comprises a flywheel disc or rotor 20 coaxially disposed in the blower housing 10 on one end of a drive shaft 21 for rotation therewith. Shaft 21, in turn, is rotatably supported in a bearing 22 carried by the frame structure 11. It will be understood that the shaft 21 may be driven in usual manner from any suitable power source, and accordingly, it has not been deemed necessary to illustrate any specific drive means for this shaft.

Fixedly secured on the disc 20 are a series of generally radially directed straight knives 25 having their cutting edges 25' disposed in a common plane of rotation contiguous to the adjacent edge of the ledger bar 13. The cutting edges 25' of these knives 25 are all directed in the direction of rotation of the flywheel disc 20 so that said knives may all successively coact in shearing relation with the ledger bar 13 to cut off short lengths of crop material moving into the housing 10 across ledger bar 13. As viewed in Figure 1, the disc 20 and knives 25 will rotate in a counter-clockwise direction.

Each knife 25 is supported, preferably at its radially inner and outer ends only, in spaced relation from the flywheel disc to leave a free and unobstructed space between the medial portion of each knife and the disc, through which the material just cut by each knife, as well as by preceding knives, is free to pass, it being understood that such material at the time it is being cut will have no rotational movement and thus will be caused by its inertia to lag behind the rotational movement of the cutter and blower unit. This will result in some relative rotation between the cutter and the blower unit and the material.

Suitable means for thus supporting each knife 25 may comprise the radially inner and outer supports 26 and 27, respectively. Inasmuch as such supports are of substantially identical construction, it will suffice to provide a detailed description only of the several parts of the inner support 26, it being understood that corresponding parts of the outer support 27 are designated by similar but primed reference characters.

Inner support 26 is of tubular construction and has an externally threaded preferably integral tubular shank 28 which is disposed through an opening in the disc 20 and secured in fixed position therein by lock nuts 29 and 30. The knife 25 is secured against a preferably inclined seat 31 on the end of support 26 by means of a bolt 32 extending through the tubular support 26 and its threaded shank 28 and secured against axial displacement by lock nuts 33 on said bolt abutting against the adjacent end of the shank 28. A radial arm 34 integral with support 26 carries a lug 35 in engagement with one of the non-cutting edges of the knife 25 to thereby maintain support 26 in a fixed rotational position about its threaded stem 28 in which the knife seat 31 and knife 25 thereon are both tilted or inclined rearwardly from the direction of rotation about the rectilinear cutting edge 25' of the knife.

An inner series of fan blades or paddles 36 is carried by the disc 20 inwardly of the medially radial sections of the knives 25 to thus avoid contact with most of the cut material passing between the knives and the disc 20. Each such blade or paddle 36 is preferably secured by bolts 37 to an arm 38 integral with inner support 26 of one of the knives 25 and is preferably of flat conformation disposed substantially in a radial plane relative to the rotational axis of the disc 20.

It will be seen that the paddles 36 are disposed to avoid physical contact with all but a small portion of the cut material while exerting a centrifugal blowing action causing a whirling of the air within the housing and discharge thereof through the spout 18. Thus through the action of the air currents within housing 10 the cut material is caused to rotate with the disc 20 at a gradually accelerating speed as it moves radially outwardly for discharge through the spout 18. Such impacts as may occur between the paddles 36 and the cut material will be greatly minimized due both to the small proportion of such material engaged by the paddles, as well as to the relatively low peripheral speed of the paddles arising from their radially inward positions in proximity to the rotational axis of the flywheel disc 20.

An outer series of fan blades or paddles 40 is preferably provided, these being positioned radially outwardly of the medial radial portions of the knives 25 and preferably being carried by the supports 27 at the outer ends of the respective knives 25. Such paddles 40 may be bolted as at 41 to integral arms 38' extending from the respective outer supports 27. These paddles also are preferably flat and disposed in generally radial planes. Paddles 40 function both to supplement the blowing action of the inner series of paddles 36 and to positively engage and exert a mechanical flinging action on the cut material at the time of its tangential discharge through the spout 18. The radial positions of the several paddles 40 are such that they will engage the cut crop material only after same has attained a rotational speed sufficiently close to that of the paddles 40 as to result in but a negligible and harmless impact between these outermost paddles and the material.

Thus in the operation of the invention, as the cutter knives 25 rotate past the shear bar 13, material fed into the housing 10 across the shear bar 13 will be cut into relatively short lengths or segments due to the successive coaction between the respective knives 25 and the shear bar. The outermost set of fan blades or paddles is so positioned radially as to avoid contact with the material immediately after it is cut, and the inner series of paddles 36, being spaced radially inwardly on the opposite side of the medial radial portions of the knives 25 from paddles 40 will also be positioned to avoid direct physical contact with the greater portion of the material.

It will be noted that the inner paddles 36 in the preferred embodiment are located well rearwardly of the cutting edges 25' of the respective knives 25 so that the material cut by each such knife 25 will have commenced to move radially outwardly from the rotational path of the immediately following paddle 36 under the influence of the centrifugal air currents within the housing 10 thereby further reducing the possibility of impact between these paddles 36 and the material. The great majority of the material, immediately following its cutting, will be free to move between the medial portions of the respective knives 25 and the flywheel disc 20, meanwhile being rotated at an accelerating rate while also being moved radially outwardly by the action of the air currents induced by both sets of paddles 36 and 40. By the time the material has moved radially outwardly in position for engagement by the paddles 40, it will have attained a rotational speed approaching that of the paddles 40 and thus will be engaged with but a negligible degree of impact by the paddles 40, which will then function as slingers to eject it through the conduit or spout 18. The outgoing air currents through the spout 18 will act also to propel the material therethrough. It will thus be seen that the fan blades or paddles in the instant invention are arranged to promptly discharge the cut material from the housing 10 and thus avoid clogging of the cutter and blower unit while avoiding damage both to the unit and to the material such as results where fan units or slingers are disposed for positive impact against cut material.

In this application I have shown and described only the preferred embodiment of the invention simply by way of illustrating the preferred mode contemplated by me of carrying the invention into practice. However, it is apparent that the invention is capable of other embodiments and that its several details may be modified in various ways. Accordingly, the accompanying drawings and description are to be considered as merely illustrative in nature and not as exclusive.

I claim:

1. A rotary cutter and blower unit comprising a flywheel disc rotatable about a predetermined axis, a plurality of knives fixedly supported on said disc with their cutting edges extending generally radially and presented in the direction of rotation of the disc, and means extending axially between the disc and the knives for so supporting said knives at their opposite radial ends respectively in axially spaced relation to the flywheel disc, generally radially directed fan blades carried by said supporting means between the opposite radial ends of each said knife and the disc, the said fan blades of each knife being relatively radially spaced apart on opposite sides of the medial radial section of the knife and spaced from said disc, the spaces between said medial sections of the knives and the disc being unobstructed to permit free movement of cut material between the knives and disc, said support means for the respective knives including a rigid support member for each knife providing a seat for receiving and positioning its respective knife and an integral supporting arm, the respective fan blades being carried on the supporting arms.

2. A rotary cutter and blower unit comprising a drive shaft, a bearing supporting said shaft, a flywheel disc connected to said shaft and rotatably driven thereby, a plurality of knives disposed in angularly spaced relationship about the axis of said shaft and extending generally radially therefrom, said knives having cutting edges presented in the direction of rotation of said disc, means for mounting and positioning said knives on said disc in spaced relation thereto, said means comprising an inner and an outer support member for each of said knives supporting the ends only of each knife, said disc, knives and supporting members defining unobstructed spaces through which cut material may freely pass, an inner fan blade for each of said knives, means connecting said inner fan blades to said inner supports, said inner fan blades being positioned outwardly of the radially inner ends of said knives, an outer fan blade for each of said knives, and means connecting said outer fan blades to said outer supports, said outer blades projecting beyond the periphery of said disc.

References Cited in the file of this patent

UNITED STATES PATENTS

| | | |
|---|---|---|
| 613,668 | Dick | Nov. 8, 1898 |
| 826,459 | Wilder | July 17, 1906 |
| 1,793,476 | Gehl | Feb. 24, 1931 |
| 2,457,951 | Tuft | Jan. 4, 1949 |